July 11, 1950    H. GANG    2,514,754
CLUTCH CONTROL MEANS
Filed Aug. 19, 1948    4 Sheets-Sheet 2

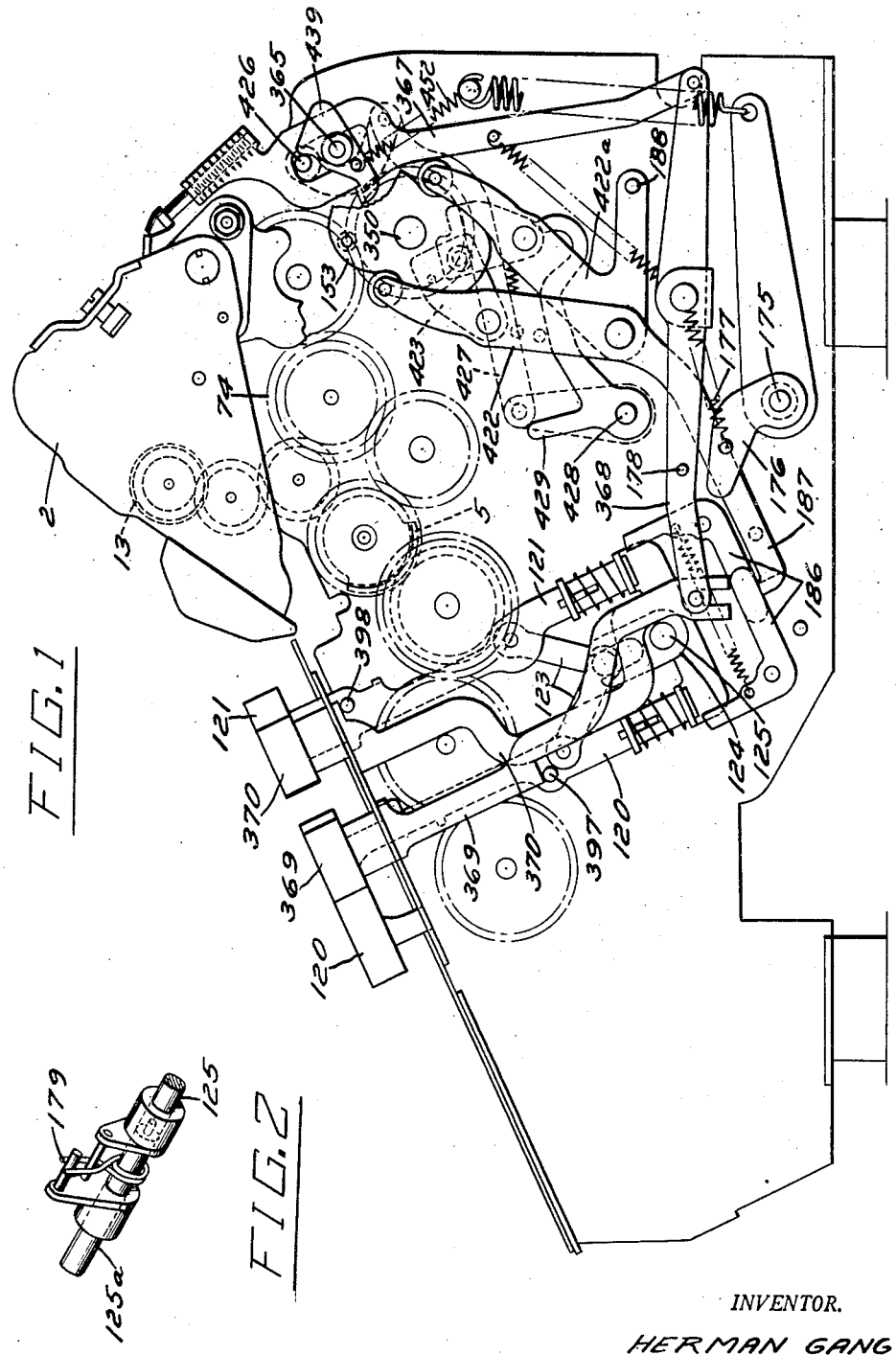

WITNESS
Fred W Pfleger

INVENTOR.
HERMAN GANG
BY
Stuart Wilde

July 11, 1950     H. GANG     2,514,754
CLUTCH CONTROL MEANS
Filed Aug. 19, 1948     4 Sheets-Sheet 3
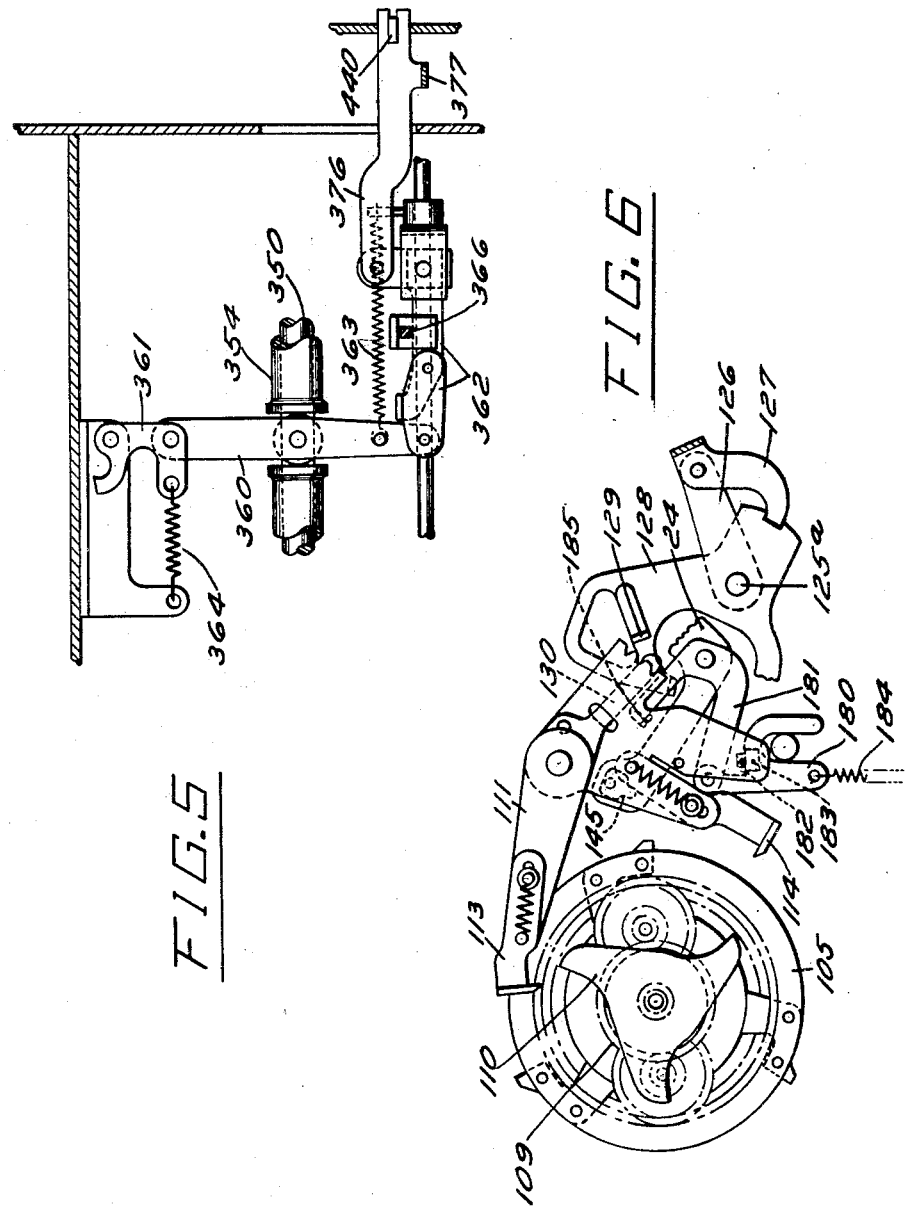
Inventor
HERMAN GANG

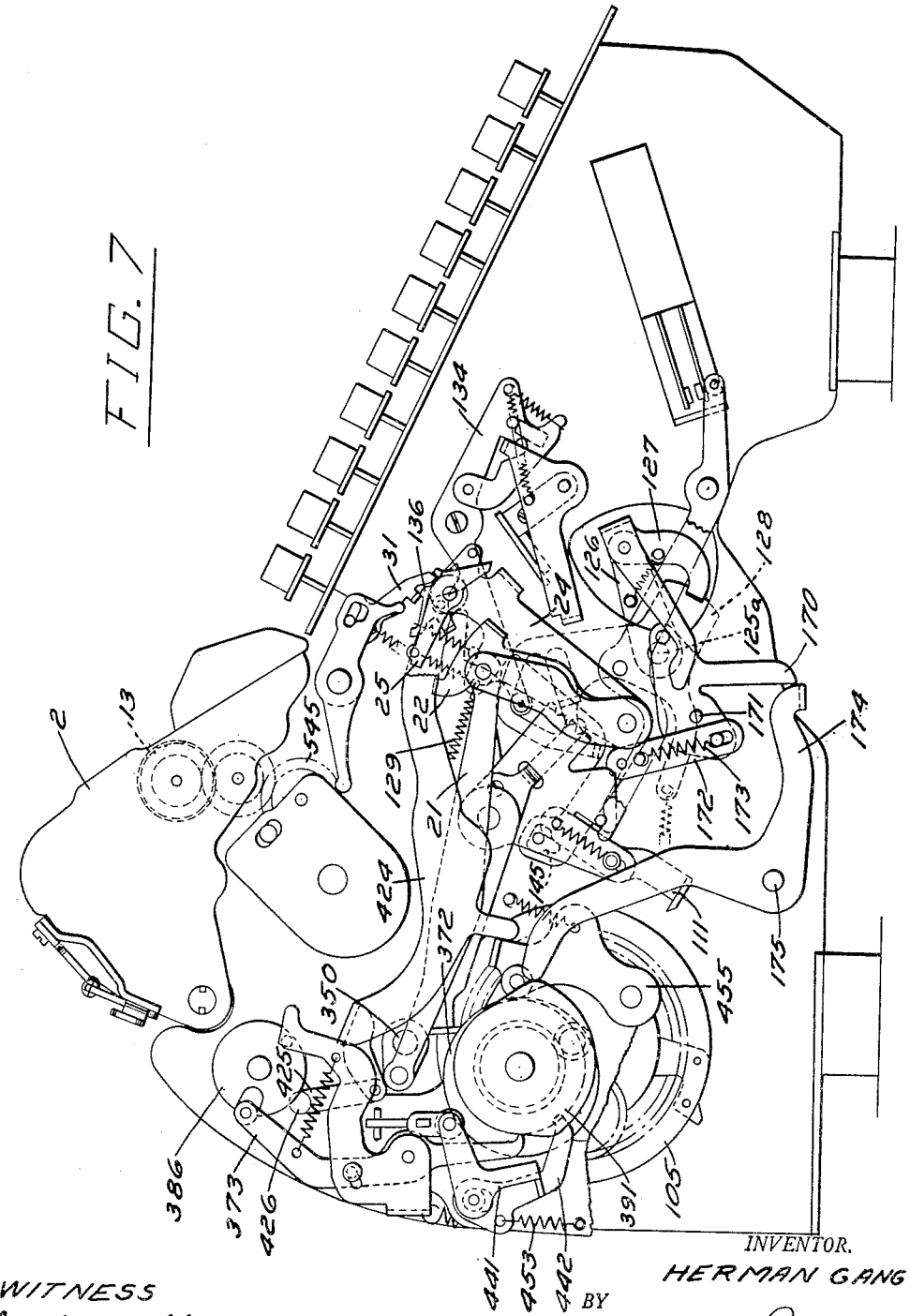

Patented July 11, 1950

2,514,754

UNITED STATES PATENT OFFICE 2,514,754

CLUTCH CONTROL MEANS

Herman Gang, Livingston, N. J., assignor to Monroe Calculating Machine Company, Orange, N. J., a corporation of Delaware Application August 19, 1948, Serial No. 45,118

7 Claims. (Cl. 235—62)

The invention has relation to key coupling control mechanism for calculating machines, and consists in the novel construction and combination of parts, as set forth in the appended claims.

The invention is shown as applied to a calculating machine constructed in accordance with the disclosure of United States Patent No. 2,419,760, issued to Edwin F. Britten, Jr., on April 29, 1947, as modified by the disclosure of patent application Serial No. 8,548, filed February 16, 1948, by the present applicant, a brief outline of such application of the invention being set forth as follows:

A primary selectively engageable clutch is provided for determining the sign of the registration and alternatively to determine the direction of shift of the register carriage. This clutch is engaged under control of registration and shifting motor operation keys, and a coupling is provided in the train between said keys and the primary clutch, to provide for stopping of the operation while a key is held manually depressed. Multiplication and division may be effected by means of these keys, a registration key being held down until the desired number of cycles has been counted or until automatic stopping is effected, whereupon a shift key is depressed, usually to effect a single step shift. Because it is not necessary to count the cycles of operation of the shifting mechanism, the shift key is usually operated by a quick touch, and the operator is likely to redepress a registration key before the coupling is reengaged, the coupling having been broken by the stopping operation following release of the shift key. As such machines have been constructed heretofore, such ultra rapid operation will result in failure of the machine to respond to depression of the registration key, and the present invention proposes, among other things, to provide for rapid operation by preventing uncoupling after manual release of the shift key.

Obviously, the invention is not limited to the specific application above outlined, since the functions of the various mechanisms associated with the several operation keys are not material.

In the accompanying drawings illustrating the invention,

Fig. 1 is a right side elevation of a calculating machine embodying the invention, with the casing removed;

Fig. 2 is a detail perspective view of a sectional rock shaft;

Fig. 5 is a detail plan view of the toggle linkage and associated parts controlling registration and carriage shift;

Fig. 6 is a detail left side elevation of the primary clutch and associated parts;

Fig. 7 is a left side elevation of the machine, with casing removed.

Registration and carriage shifting

Figure 3:
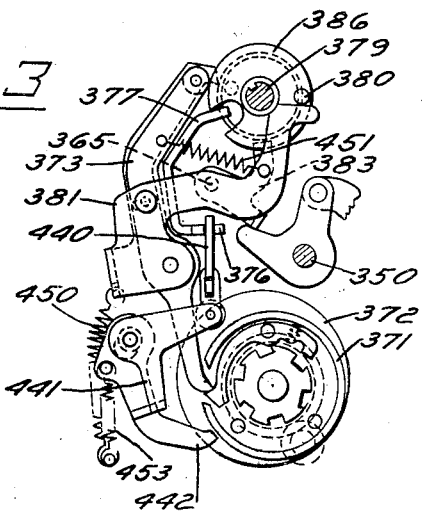
Fig. 3 is a detail left side elevation of the carriage shift control mechanism.

Power from electric motor 1 (Fig. 4) is transmitted through primary clutch 105 and gear 355 to a pair of connected drums 352, 353 forming elements of two friction clutches which may be alternatively engaged to effect registration and shifting of the carriage respectively. The clutch 105 is constructed in accordance with the disclosure of United States Patent No. 1,566,650, issued on December 22, 1925, to George C. Chase. Briefly the clutch comprises a differential gearing, the elements 105 and 109 of which normally rotate idly in opposite directions. The cooperating element of the clutch comprises a rocker 111, displaceable in one direction from a central neutral position to bring an arm 114 thereof into engagement with a lug of gear element 105, so that said element is held and the output gear of the differential is driven in a direction providing for plus registration or for shifting of the carriage toward the right. Movement of rocker 111 in the opposite direction will bring arm 113 thereof into engagement with a member 110 fast with the differential gear element 109, holding said element against rotation and effecting rotation of the output gear of the differential in a reverse direction, to provide for minus registration or shifting of the carriage toward the left.

Clutch drums 352 and 353 (Fig. 4) are connected by a sleeve 354 movable laterally to compress the friction disks of the registration clutch 352 or the shift clutch 353 respectively. A driven element of clutch 352 is fast with drive shaft 350 which has connection through gearing 74 (Fig. 1) with the differential actuators 5 which are settable in known manner to control the entry of values into register 13. The driven element of clutch 353 is fast with a gear having intermediate gear connection with a gear 357 (Fig. 4) fast upon a worm shaft 379. Carriage shifting worm 353 is also fast on shaft 379, this worm being engaged by spring urged plunger 359 mounted in the register carriage 2.

Normally, registration clutch 352 is held in engagement by a toggle linkage 362 (Fig. 5) this linkage being pivotally connected to one end of a lever 360, said lever being connected at its other end to the frame of the machine through a link 361, and being provided with anti-friction rollers engaging flanges of the sleeve 364. A spring 364 attached to the linkage 361, holds the clutch 362 engaged under spring tension. Upon breaking of the toggle 362 a spring 363, attached to lever 360 will shift the sleeve 364 toward the left (toward the right in Figs. 4 and 5) disengaging the clutch 352 and engaging the shift clutch 353.

*Manual operation control*

Manual control of registering and shifting operations is effected by selective depression and release of four motor operation keys; that is to say: Plus and minus registration operation keys, adapted to be held in depressed position by the operator to determine the number of registering cycles to be performed, such keys being commonly designated as plus and minus bars. Auxiliary keys operable to disengage the actuator clutch and to engage the carriage shift clutch, are adapted to depress the plus and minus bars, respectively, to determine the direction of shift, such keys being designated right and left shift keys.

The plus bar 120 and minus bar 121 (Fig. 1) are connected by links 123 with an arm 124 fast upon a composite rock shaft 125, 125a, this shaft extending across the machine and being provided at its left hand end with an arm 126 (Fig. 6) having coupling connection 127 with a setting plate 128. Setting plate 128 is provided with opposed lugs 129 lying upon either side of a tooth 130 of rocker 111, so that depression of one of the keys 120, 121 will rock shaft 125, 125a, and, through plate 128 will move rocker 111 from neutral position to engage the arm 113 or 114 with the related elements of the primary clutch.

Upon release of key 120 or 121, the primary clutch will be disengaged as follows: Upon depression of the key and rocking of setting plate 128 (Fig. 7), one of two opposed cam faces of said plate will depress the rearward end of a lever 134 (Fig. 7), carrying a pawl 136, mounted upon said lever into position with a lug of said pawl underlying a lug of a trigger 31. Upon release of the key, plate 128 will be centralized and the rear end of lever 134 will rise under spring bias, carrying pawl 136 against the lug of trigger 31 and thereby raising the trigger. Normally trigger 31 holds a spring pressed pawl 25 out of engagement with a rock lever 22, connected by link 21 with a crank arm of shaft 350. It will be observed that as long as registering clutch 352 is engaged, rock lever 22 will be reciprocated, and upon release of pawl 25 by trigger 31, said pawl will fall into engagement with the rock lever, thereby coupling said lever with a stopping or clutch releasing arm 24 upon which pawl 25 is mounted. Arm 24 will thus be reciprocated with rock lever 22 and a rearward extension of arm 24 will be lifted, bringing a cam portion 145 of said extension into contact with a pin on the rocker 111 and centralizing said rocker to disengage the primary clutch. The clutch having been disengaged, a spring 129 will restore arm 24 to normal position, thereby carrying rock lever 22 to its rearward position, corresponding to the full cycle position of the differential actuators 5. As arm 24 returns to normal, a lug of pawl 25 will engage the end of trigger 31 and the pawl will be lifted out of engagement with rock lever 22.

Differential actuating mechanism 5, being freed from the control of the primary clutch 105, will be located in full cycle position as follows: a locator cam 153 (Fig. 1) is fast upon shaft 350, the low portions of this cam being engaged when the machine is standing at rest by a pair of anti-friction rollers mounted on opposed follower arms 422, 422a. These follower arms are connected by a toggle linkage 423 which, during the first cycle of registering operation will be moved by the arms into latching position, to hold the anti-friction rollers separated for the remainder of the operation. As the registration is terminated, toggle 423 will be tripped by the forward movement of stopping arm 24, said arm being connected by link 424 (Fig. 7) with a crank 425 of a shaft 426, said shaft extending across the machine and being provided at its right hand end with link connection 427 (Fig. 1) with a shaft 428, upon which is mounted a finger 429 movable against a joint of the toggle as arm 24 moves forward. The toggle being broken, the spring urged arms 422, 422a, acting through the locator cam 153, will move the differential actuating mechanism 5 to and hold it in full cycle position.

In controlling the shifting of the register carriage, depression of right shift key 369 will bring a shoulder of the key stem into contact with a pin 397 of the plus bar 120 thereby depressing the plus bar and effecting engagement of arm 114 (Fig. 6) of rocker 111 with the differential gear element 105. Similarly, depression of left shift key 370 will bring a lug of the key stem into contact with a pin 398 of minus bar 121, carrying this bar downward and effecting engagement of arm 113 of rocker 111 with clutch member 110. Thus the output gear of the primary clutch differential will be driven in one or the other direction respectively. Further, depression of right shift key 369 or left shift key 370 will break the toggle 362, to disengage the registration clutch 352 and engage the carriage shift clutch 353. This is effected by an intermediately pivoted lever 368 engaged at its forward end by the stems of the keys 369, 370 and having pivotal connection at its rear end with a bar 367, guided at its upper end by slot engagement with a shaft 365. A tooth of bar 367 underlies a laterally bent lug of an arm 439 fast upon shaft 365, said shaft having also fast thereupon a finger 366 (Figs. 4 and 5) engaging a lug of one of the links of toggle 362. Therefore, depression of one of the shift keys will rock lever 368 and shaft 365, and finger 366 will break the toggle 362.

Certain other controls are necessary in effecting the shifting operation, since the carriage shifting worm must be freed from a normal location means when the operation is initiated, and at the end of the operation provision must be made for disengaging the primary clutch 105, and the toggle 362 must be restored to its normal position.

To effect these operations a two phase shift control clutch 371 (Fig. 3) is provided, said clutch being engaged for a partial operation upon breaking of toggle 362 and being again engaged to complete its cycle of movement upon termination of the shift.

The driving element of the clutch has direct gearing connection with the motor 1, and the clutch pawl mounted upon the driven element of the clutch is normally held out of engagement with the driving element, against the bias of its spring by detent 442, engaging the pawl through a cutaway portion of the clutch housing.

Figure 4:
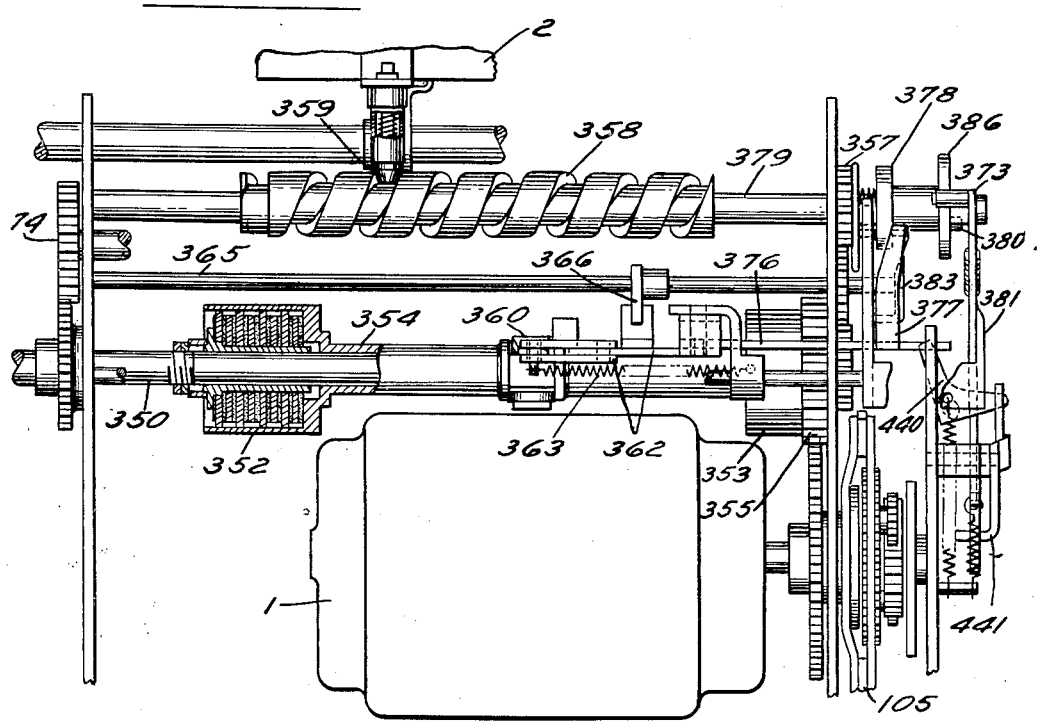
Fig. 4 is a rear elevation of the motor drive and carriage shift mechanisms.

When toggle 362 is broken to initiate a shift a link 376 connected to a crank extension of one of the toggle links will be moved to the right as shown in Figures 4 and 5, thereby rocking a pair of bell crank levers 440, 441. Bell crank lever 441 engages the detent 442 and in the movement of link 376 will move said detent away from the clutch pawl against the tension of spring 453, thus permitting engagement of the clutch 371. An intermediately pivoted detent 373 normally rests at its lower end against the housing of clutch 371, and is provided at its upper end with an anti-friction roller normally engaging a notch of a disk 386 as shown in Fig. 7. Disk 386 is splined upon the worm shaft 379, and the engagement of the anti-friction roller of detent 373 in the notch of said disk will prevent rotation of the shifting worm 358 and will consequently hold the register carriage 2 in laterally adjusted position. Upon partial rotation of clutch 371 (Fig. 3), detent 373 will be forced through the aperture of the clutch housing by a spring 450 attached to a tripping arm 381 having pin and slot connection with said detent. This movement of detent 373 will effect release of clutch 371 and will remove the anti-friction roller from the notch of disk 386, freeing worm 358 to effect lateral movement of register carriage 2, this position of the parts being illustrated in Figure 3 of the drawings. Upon release of the shift key 369 or 370 by the operator, spring 452 (Fig. 1) will rock shaft 365 to provide for reengagement of clutch 371 as follows. Disk 386 is connected by a sleeve with a second disk 378, normally held toward the left as viewed in Figure 4 against the bias of a spring by an arm 377 of link 376. Upon breaking of the toggle 362, arm 377 will be moved to the right, but disk 378 will now be engaged by an arm 383 fixed upon shaft 365, so that the disks 378 and 386 will remain held in the position illustrated in Figure 4 until shaft 365 is rocked upon release of the shift key. Thereupon these disks will move to the right and a pin 380 fixed in the disk 386 will be brought into the plane of a cam extension of tripping arm 381. As the register carriage 2 is shifted into its new position by worm 358, pin 380 will contact with tripping arm 381, putting detent 373 under the tension of a spring 451 connecting the detent and tripping arm and thereby providing for movement of the anti-friction roller of the detent into the notch of disk 386 as the parts arrive in normal position, thus rocking detent 373 clockwise to allow reengagement of clutch 371.

The rise of the depressed shift key and the related key 120 or 121 will permit rocking of lever 134 and the tripping of stopping pawl 25, but since rock lever 22 does not operate during the shift the final operation of clutch 371 is relied upon to rock the stopping arm 24. For this purpose a cam 372 (Fig. 7) fast with the driven element of clutch 371 has engagement with an anti-friction roller mounted on a follower 455, said follower in turn having engagement with a shoulder of the link 424 which, as previously described, is connected with arm 24. Therefore during the final operation of clutch 371 arm 24 will be reciprocated, and the cam portion 145 of said arm will disengage the main clutch, and pawl 25 will be reengaged with trigger 31.

The toggle links 362 will be returned to their normal position during the final operation of clutch 371 by means of a cam 391, fast with the driven element of said clutch, said cam engaging an anti-friction roller mounted on the bell crank lever 441, whereby bell crank lever 440, link 376 and toggle links 362 will be positively returned to normal position, and detent 442 allowed to engage the clutch dog and disengage clutch 371.

*Key coupling control*

The coupling 127 (Fig. 7) is provided in order that the primary clutch 111, 105 may be disengaged while any one of the operation keys 120, 121, 369, 370 is held depressed by the operator. The necessity for this may occur in non-repeat operations of known character; in the course of a division operation; when the register carriage 2 has been shifted into either extreme position; or when said carriage is arrested by means of a tabulator stop, in known manner. Under any of these conditions, the trigger 31 will be tripped by means not shown, or arm 24 will be otherwise operated to disengage the clutch, setting plate 128 being returned idly to its normal position, while rock shaft 125, 125a remains in operative position, as provided for by the release of coupling 127.

Coupling 127 is released by the operation of a lever 170 fulcrumed upon a framing at 171, having yieldable connection by means of a link 172 with the rearward clutch releasing extension of stopping arm 24. Link 172 is connected with lever 170 by a slot and pin engagement, the parts being held in pivotal relation to each other by a spring 173. Lever 170 is provided with a pin overlying a rearward arm of coupling 127. Thus, normally, during each stopping operation, coupling 127 will first be released and thereafter the primary clutch will be disengaged.

When, however, the plus bar 120 or minus bar 121 is depressed before a carriage shift has been completed, coupling 127 will remain unbroken, so that at the end of the cycle arm 24 will be driven forwardly and returned to normal position, whereby pawl 25 will be elevated out of engagement with rock lever 22; the primary clutch will be reengaged, and the plus or minus registration effected.

To effect this it is necessary to disable the coupling disengaging lever 170 and in order to prevent kicking back of the key by arm 24 it is preferable to allow the setting plate 128 to yield temporarily. Lever 170 is disabled by means of a blocking arm 174, fixed upon a shaft 175 which extends across the machine and is provided at its opposite end with a fixed arm 176 (Fig. 1) having spring connection 177 with the framing of the machine, spring 177 serving to bias arm 174 into blocking relation with lever 170. Blocking arm 174 is held out of blocking position by means of a cam 391, fast with the shift controlling clutch 371, the cam being moved into releasing position during the preliminary operation of said clutch. Upon release by cam 391 blocking arm 174 will be held out of operation, during the depression of the shift key 369 or 370, by means of a pin 178 fixed in the lever 368, engaging arm 176. Upon release of the shift key, the forward arm of lever 368 will rise and the blocking arm 174 will be released.

If the shift key is released during the shifting cycle, spring 177 will rock blocking arm 174 counterclockwise as viewed in Fig. 7, and the lug on the forward end of said arm will be positioned in the path of movement of lever 170, so that upon movement of the stopping arm 24 the connection 172, 173 will yield and coupling 127 will not be broken. At the end of the shifting operation, clutch 371 will be reengaged and cam 391 will remove blocking arm 174 from engagement with lever 170.

The yielding of setting plate 128, above referred to, is provided for by making shaft 125, 125a in two sections, as seen in Fig. 2, the sections being connected by a spring 179 so that the two sections of the shaft normally operate as one, but may yield when the clutch lever 111 is centralized by the operation of arm 24 if coupling 127 remains unbroken. Upon release of clutch lever 111 in the return movement of arm 24, spring 179 will realign the sections of shaft 125, 125a, rocking plate 128 and thereby moving clutch lever 111 again into clutch engaging position to initiate registration.

Since the plus or minus bar 120, 121 may be depressed during the shifting of the register carriage 2 toward the right or toward the left, means are provided to prevent reversal of clutch lever 111 from plus to minus or from minus to plus operating position in mid-cycle. For this purpose a latch 180 (Fig. 6) is pivotally connected with a lever 181 fulcrumed upon the pivot stud of arm 24, and guided by contact with a stud fixed in the frame of the machine. Latch 180 has a lug 182 which overlies lug 183 of clutch lever 111 when said lever stands in its neutral position. Upon movement of clutch lever 111 in either direction into clutch engaging position, lug 183 will move away from lug 182 and a spring 184 will move latch 180 downward, bringing lug 182 into latching engagement with one of the side faces of lug 183.

Lever 181 has an upper extension provided with a lug 185 overlying the rearward extension of arm 24. Lug 185 will be contacted upon movement of said arm in a clockwise direction as viewed in Fig. 6, at the conclusion of the final cycle of registration or of carriage shifting, when lever 181 will be rocked clockwise and lug 182 elevated out of restraining engagement with lug 183, so that clutch lever 111 may be centralized.

Since blocking arm 174 is effective to prevent confusion only during the performance of a carriage shift, interlock means are provided to prevent similar confusion during a registering cycle. Two erroneous operations must be prevented by this interlocking means, first, the depression of the plus bar 120 during a minus registering cycle or the depression of minus bar 121 during a plus registering cycle, and second, the depression of a shift key during a registering cycle. Both of these interlocks are controlled by the locating cam 153, and are inactive during shifting cycles. A pair of spring connected locking pawls 186 (Fig. 1) are pivotally mounted on the framing of the machine, beneath the plus and minus bars 120, 121, these pawls being held out of engagement with the stems of these keys by means of extension 187 of the locator follower arm 422. Upon movement of locator cam 153 following depression of the plus and minus bar pawls 186 will be released and that one of the pawls which stands below the key which has not been depressed will be rocked into position under said key, thereby preventing depression thereof until the operation is concluded and follower arm 422 is restored to normal position. Means for locking the shift keys 369, 370 during a calculating operation consists in a pin 188 mounted in an extension of follower arm 422a. Upon displacement of arm 422a by locator cam 153 pin 188 will be brought in contact with the rear arm of lever 368, thereby holding said lever and the keys 369, 370 against displacement, until arm 422a is released at the end of the registering operation.

I claim:

1. In a motor driven calculating machine having a clutch, a plurality of operation keys, an operation controlling train common to said keys and acting to maintain engagement of said clutch in response to key depression, a coupling in said train displaceable to break the connection between the keys and the clutch, an operation stopping means responsive to manual release of any of said keys to disengage said clutch; a lever having yieldable connection with the stopping means and operable thereby to displace said coupling, and a normally inactive blocking arm responsive to depression and release of one of said keys to prevent operation of the displacing lever.

2. A motor driven calculating machine according to claim 1, wherein the operation controlling train includes two members and a yieldable spring connection between said members, whereby release of the clutch is permitted with an operation key held manually depressed and the coupling engaged.

3. In a motor driven calculating machine having a clutch, a plurality of operation keys including an auxiliary key, an operation controlling train common to said keys and acting to maintain engagement of said clutch in response to key depression, a coupling in said train displaceable to break the connection between the keys and the clutch, operation stopping means responsive to manual release of any of said keys to disengage said clutch, and a lever having yieldable connection with the stopping means operable thereby to displace said coupling; a spring biased blocking arm operable to prevent operation of the displacing lever, a power driven operation controlling means responsive to depression of said auxiliary operation key, a cam normally holding the blocking arm inactive and movable by said operation controlling means to release said arm, and connections between the auxiliary operation key and the blocking arm acting to hold said arm inactive during depression of said key.

4. A motor driven calculating machine according to claim 3, in which the operation keys include a registration key, and having power driven operation controlling means responsive to depression of said registration key; the provision of an interlocking arm movable by said registration controlling means to prevent depression of the auxiliary key.

5. In a motor driven calculating machine having a driving train, a selectively engageable direction determining clutch in said train including a member movable in opposite directions from neutral disengaged position, an operation stopping means including a releasing arm having cam engagement with the movable clutch member and operable to restore said member to neutral position, a plurality of operation keys, and an operation controlling train common to said keys and including a spring element acting to bias the movable clutch member in one or in the other direction in accordance with the key depressed; a spring operated latch engageable with the movable clutch member to hold the same in either engaged position, and a lever operable by the clutch releasing arm to release said latch.

6. A motor driven calculating machine according to claim 5, wherein a coupling is provided in the operation controlling train displaceable to break the connection between the keys and the clutch, and wherein the operation stopping means is responsive to manual release of any of said operation keys; the provision of a lever having yieldable connection with the stopping means and operable thereby to displace said coupling, and a normally inactive blocking arm responsive to depression and release of one of said keys to prevent operation of the displacing lever.

7. In a motor driven calculating machine having a clutch, a plurality of operation keys, an operation controlling train common to said keys and acting to maintain engagement of said clutch in response to key depression, a coupling in said train displaceable to break the connection between the keys and the clutch, an operation stopping means responsive to manual release of any of said keys to disengage said clutch; a pivotally mounted member having yieldable connection with the stopping means and operable thereby to displace said coupling, and a normally inactive member responsive to depression and release of one of said keys and effective to cause yielding of said yieldable connection to prevent operation of said displacing member.

HERMAN GANG.

REFERENCES CITED

The following references are of record in the file of this patent:

UNITED STATES PATENTS

| Number | Name | Date |
|---|---|---|
| 2,096,465 | Overbury | Oct. 19, 1937 |
| 2,149,371 | Uhlig | Mar. 7, 1939 |
| 2,221,686 | Wicks | Nov. 12, 1940 |